PER ERIK NORDQVIST.
FRICTION CLUTCH AND THE LIKE.
APPLICATION FILED APR. 15, 1920.

1,398,564.

Patented Nov. 29, 1921.

Inventor,
Per Erik Nordqvist,
by
Hubert R. Kerseake
Atty.

UNITED STATES PATENT OFFICE.

PER ERIK NORDQVIST, OF DUFBO, SUNDBYBERG, SWEDEN.

FRICTION-CLUTCH AND THE LIKE.

1,398,564.  Specification of Letters Patent.  Patented Nov. 29, 1921.

Application filed April 15, 1920. Serial No. 374,155.

*To all whom it may concern:*

Be it known that I, PER ERIK NORDQVIST, a subject of the King of Sweden, residing at Dufbo, Sundbyberg, Sweden, have invented certain new and useful Improvements in Friction-Clutches and the like, of which the following is a specification.

This invention relates to friction clutches of that type, which consist of an inner divided friction member or ring, which is expanded and forced against an outer member or disk by means of lever-mechanisms provided at the division points respectively. The characteristic feature of the invention consists in the said lever-mechanism comprising a two-armed lever, which is swingable longitudinally of the shaft and the one arm of which by means of a ball-joint is connected with the adjacent ends of two links extending transversely of the shaft in such manner, that by the swinging of the said lever the inner ends of the links are moved longitudinally of the shaft and the links force the adjacent ends of the friction ring away from one another, the other (inner) arm of the said lever being connected with a rod slidable longitudinally of the shaft and adapted to swing the lever. Owing to the said arrangement the expansion-mechanism may be inclosed within the outer friction member and shifted from outside, so that the clutch can be rendered dust-tight.

In the accompanying drawing, wherein a proposed embodiment of the invention is illustrated:

Figure 1:
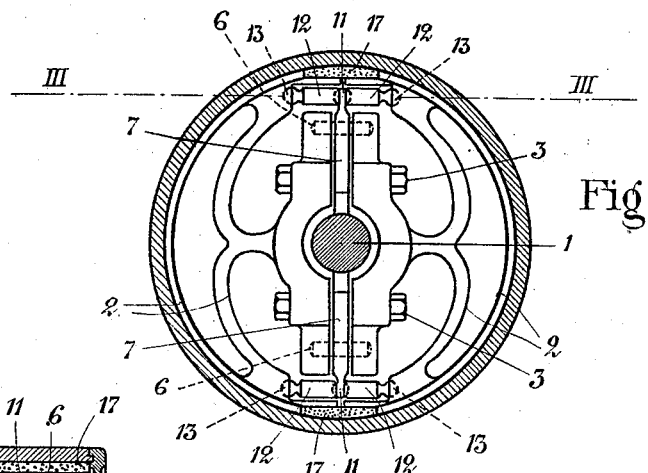
Figure 1 is a cross section of the improved clutch.
Figure 2:
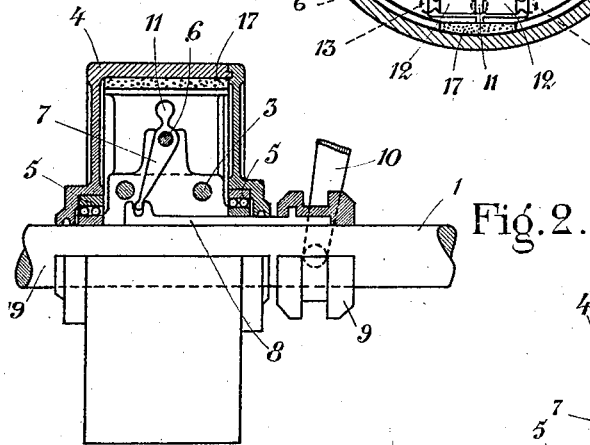
Fig. 2 is a side elevation thereof, partially in section.
Figure 2A:
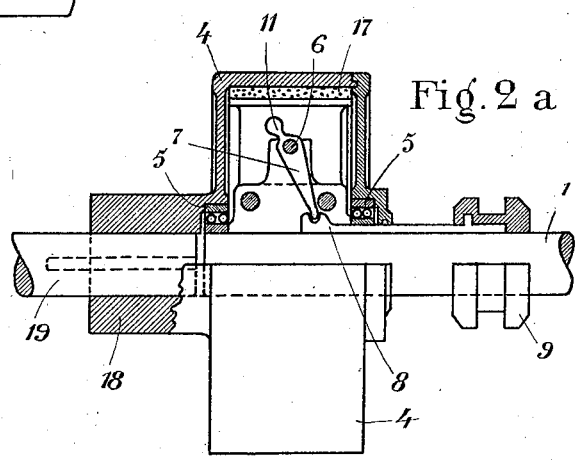
Figure 3:
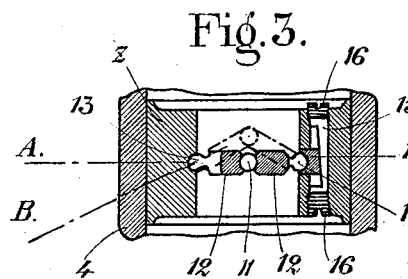

Fig. 2ᵃ is a view similar to Fig. 2, of a slightly modified form of the invention;

Fig. 3 is a section on the line 3—3 of Fig. 1.

Referring to the drawing in detail 1 indicates a shaft to which the two parts of an inner divided friction member or ring are fixed by means of screw-bolts 3. An outer member or disk 4, which may serve as a belt pulley, incloses the inner clutch-member and is journaled on the shaft 1 by means of ball-bearings 5. Between the halves 2, 2 of the inner member and on opposite sides of the shaft 1 two two-armed levers 7 are pivoted at 6, which at their inner ends are jointed to two rods 8 respectively, movable longitudinally of the shaft and shiftable in the known manner by means of a sleeve 9 and a hand lever 10. The outer ends 11 of the levers 7 are ball-shaped and engage the cup-shaped ends of two pairs of links 12, 12 respectively. The other ends of the said links are provided with balls 13, which engage cup-shaped parts of the halves 2, 2 of the inner clutch-member.

In the halves 2, 2 of the inner clutch-member blocks 14 or the like are provided, which may be shifted by means of wedges 15 and adjusting screws 16 for the controlling of the pressure between the members of the clutch.

Lubricating pads 17 are provided on suitable places between the halves of the inner friction member and the outer disk 4. The said pads may however be omitted.

The clutch operates in the following manner: For the connecting of the normally free outer disk 4 with the shaft 1 the sleeve 9 is moved to the position shown in Fig. 2, during which operation the levers 7 are swung and the links 12 are shifted from the position shown by dotted lines in Fig. 3 to the position shown by full lines in the said figure (see lines A and B, Fig. 3). The two halves 2, 2 of the inner clutch member are thus forced against the inner side of the outer disk 4, so that the latter is connected with the shaft by friction. For the disconnecting of the disk from the shaft the sleeve 9 is moved away from the clutch, so that the links are returned to the position shown by dotted lines in Fig. 3. The halves 2, 2 are then returned to their initial position acted upon by the inherent resiliency of the ring halves, so that the disk 4 is released.

In the form of the invention illustrated in Figs. 1 and 2 and described above the outer member of the clutch is arranged like a belt-pulley so that the device will operate as an ordinary pulley provided with a friction clutch.

The invention may, evidently, be applied to friction brakes (safety-brakes), in which case the outer disk 4 is made stationary in any suitable manner. The clutch may be used also for connecting the ends of two shafts, as suggested in Fig. 2ᵃ. The outer disk 4 is then provided with a sleeve 18 which by means of a key or in any other suitable manner is fixed to the end of the shaft 19, located on a line with the shaft 1, so that the shaft 19 partakes in the rotary motion of the shaft 1, when the clutch has been brought into operative position.

In each form of the invention, the outer member of the clutch is of such construction as to afford a casing for the operating mechanism for the inner expansible clutch member and consequently the latter is effectively protected against the admission of dust or such other foreign matter as would be detrimental to the efficiency and life of the clutch.

I claim:

In a clutch, an inner clutch element composed of a plurality of relatively movable parts, an outer clutch member engageable by the parts of the inner clutch element and constituting a dust-proof casing for the protection of said inner clutch member, pairs of links interposed between the parts of the inner clutch element and swivelly connected therewith, levers pivotally mounted between the parts of the inner clutch element and having certain extremities thereof engaged between the links of the pairs whereby to move the latter into substantial alinement and effect separation and expansion of the inner clutch element parts, and actuating rods extending between the parts of the inner clutch element and connected with the levers for actuating the latter.

In testimony whereof I have affixed my signature in the presence of two witnesses.

PER ERIK NORDQVIST.

Witnesses:
   STURE QIDINGER,
   SNER HOLWRSON.